United States Patent [19]
Brodnax et al.

[11] Patent Number: 5,649,097
[45] Date of Patent: Jul. 15, 1997

[54] SYNCHRONIZING A PREDICTION RAM

[75] Inventors: Timothy B. Brodnax, Austin, Tex.; Bryan K. Bullis, Woodbridge, Va.; Steven A. King, Herndon, Va.; Robert L. Schoenike, Warrenton, Va.; Daniel L. Stanley, Manassas, Va.

[73] Assignee: International Business Machines Corporation, Armonk, N.Y.

[21] Appl. No.: 653,136

[22] Filed: May 24, 1996

Related U.S. Application Data

[63] Continuation of Ser. No. 240,290, May 9, 1994, abandoned, which is a continuation of Ser. No. 783,060, Oct. 25, 1991, abandoned.

[51] Int. Cl.$^6$ .................................................. G06F 11/00
[52] U.S. Cl. ............... 395/185.07; 395/182.09; 364/943.92; 364/268.3
[58] Field of Search ............... 395/575, 185.07, 395/185.01, 182.03, 182.04, 182.08, 182.09, 182.1; 371/68.3, 16.1, 67.1, 68.1, 21.1, 21.2; 364/268.3, 268.4, 261.7, 263.1, 269, 268.9, 931.4, 931.41, 943.92

[56] References Cited

U.S. PATENT DOCUMENTS

| | | | |
|---|---|---|---|
| 4,370,711 | 1/1983 | Smith | 364/200 |
| 4,418,401 | 11/1983 | Bansal | 365/95 |
| 4,428,044 | 1/1984 | Liron | 364/200 |
| 4,521,847 | 6/1985 | Ziehm et al. | 364/184 |
| 4,608,633 | 8/1986 | Boothroyd et al. | 364/200 |
| 4,751,670 | 6/1988 | Hess | 364/900 |
| 4,760,520 | 7/1988 | Shintani et al. | 364/200 |
| 4,763,245 | 8/1988 | Emma et al. | 364/200 |
| 4,777,594 | 10/1988 | Jones et al. | 364/200 |
| 4,887,220 | 12/1989 | Kiya et al. | 364/474.11 |
| 4,984,154 | 1/1991 | Hanatani et al. | 364/200 |
| 5,136,697 | 8/1992 | Johnson | 395/375 |
| 5,142,634 | 8/1992 | Fite et al. | 395/375 |
| 5,226,152 | 7/1993 | Klug et al. | 395/575 |
| 5,265,213 | 11/1993 | Weiser et al. | 395/375 |
| 5,278,969 | 1/1994 | Pashan et al. | 395/182.04 |
| 5,345,571 | 9/1994 | Marisada | 395/375 |

*Primary Examiner*—R. W. Beausoliel, Jr.
*Assistant Examiner*—Trinh Tu
*Attorney, Agent, or Firm*—Michael A. Davis, Jr.

[57] ABSTRACT

A fault tolerant processing system including a prediction RAM employs a Lock Step Compare routine. The method developed allows the processing system to recover from single event upsets. In initialization, the branch prediction RAM is set to a known value. An engineering balance is achieved by adding logic to detect a branch RAM error and incurring the delay of re-initializing the entire RAM only when a RAM error has been detected.

8 Claims, 4 Drawing Sheets

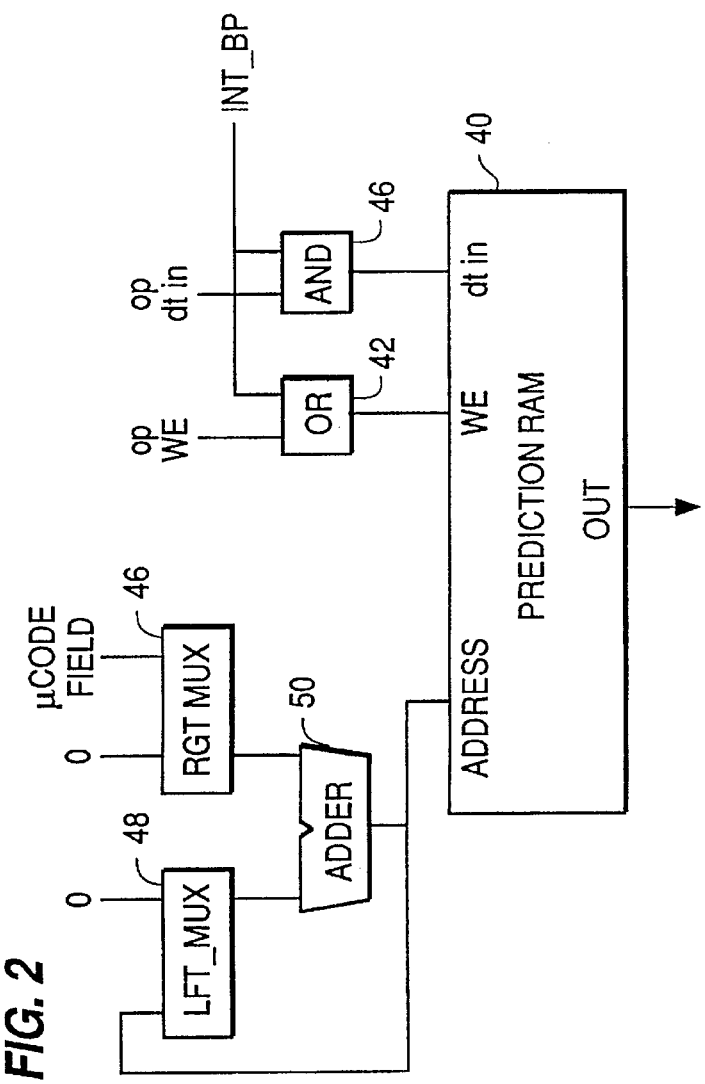
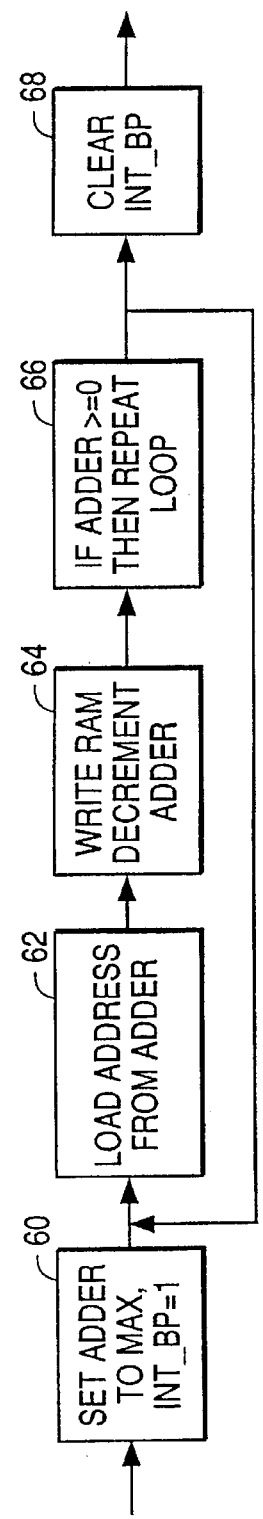
FIG. 2
FIG. 3a

SYNCHRONIZING A PREDICTION RAM

This is a continuation of application Ser. No. 08/240,290 filed May 9, 1994, abandoned, which is a continuation of Ser. No. 07/783,060, filed on Oct. 25, 1991, abandoned.

BACKGROUND OF THE INVENTION

1. Technical Field

The invention disclosed broadly relates to fault tolerant digital computer processing systems and more particularly relates to a fault tolerant data processing system including a prediction RAM.

2. Background Art

The stored program digital computer is in widespread usage in a variety of applications. Digital computers are utilized to implement complex banking and business systems as well as in control of industrial processes. The digital computer is also found in widespread usage in avionics, military and spaceborne applications where fault tolerance is critical.

Present day digital computers are composed of hundreds of thousands of discrete semiconductor or integrated circuit bi-stable elements generally denoted as latches. A latch is a high speed electronic device that can rapidly switch between two stable states in response to relatively low amplitude high speed signals. Latch circuits are utilized to construct most of the internal hardware of the digital computer such as logic arrays, the memories, the registers, the control circuits, the counters, the arithmetic and logic units, and the like. Since present day digital computers operate at nanosecond and sub-nanosecond speeds, rapidly changing electronic signals normally flow through the computer circuits. Such signals radiate electromagnetic fields that couple the circuits in the vicinity of the signal path. These electrical signals cannot only set desired latches into desired states, but can also set other latches into undesired states. An erroneously set latch can unacceptably compromise a data process by the computer or can completely disrupt the data processing flow thereof. Functional error modes without component damage in digital computer based systems are denoted as digital system upsets.

Digital system upset can also result from spurious electromagnetic signals such as those caused by lightning that can be induced upon internal electrical cables throughout an aircraft. Such transient spurious signals can propagate to internal digital circuitry setting latches into erroneous states. Additionally, power surges, radar pulses, static discharges and radiation from nuclear weapon detonation may also result in digital system upset. When subject to such conditions, electrical transients are induced on system lines and data buses resulting in logic state changes that prevent the system from performing as intended after the transient signal. Such electromagnetic transients can penetrate into the Random Access Memory area of the computer and scramble the data stored therein. Such transients can be induced on wiring throughout a digital computer system.

Digital computer programs are stored in various instruction sets in a computer system. In a complex digital computer system, many conditional branch instructions are encountered during the running of the software program. When a branch instruction is encountered, it is wasteful of the computer resource to wait for the resolution of the instruction before proceeding with the next programming step. Therefore, it is a known advantage to provide a prediction mechanism to predict in advance the instruction to be taken as a result of a conditional branch. If this prediction is successful, it allows a computer system to function without a delay in processing time. There is only a time penalty if the prediction is incorrect. Therefore, it is important to provide a branch prediction mechanism with a high prediction accuracy to minimize the time loss occurred by incorrect predictions.

In the computer systems, branch prediction mechanisms which accurately predict the outcome of a conditional branch instruction, before the branch instruction is executed, are used to guide prefetching of an instruction or the conditional issue of instructions. The prediction need not always be correct, but incorrect predictions typically result in a time penalty when the instructions along the correct path are fetched and conditional issued instructions on the path are canceled.

To enhance a computer system's tolerance to upsets, the checking scheme known as Lock Step Compare was developed. This is of great value in high reliability applications such as banking systems or satellite systems. Shown in FIG. 1, a central processing unit designated as "Lord" chips is checked by giving a second CPU designated "Vassals" access to critical buses. A bus is critical if a mistake on it will corrupt the state of the system. Such an error should be detected immediately, before a checkpoint is established. If a vassal disagrees with what its lord chip has put out on a given bus (which indicates an error in execution on either the lord chip or the vassal chip), it activates the retry line which will return the CPU to a known checkpoint. The CPU will retry the instructions beginning at the known checkpoint.

A Random Access Memory (RAM) may be included in the CPU to help predict conditional branches and enable pre-decoding of instructions based on previous branches from a given location. If the RAM leads to a correct guess, performance will be enhanced by the pre-decoding. Otherwise, the pre-decode will be ignored and the correct instruction will be fetched and decoded after the resolution of a branch condition. No RAM upset protection is needed because an infrequent upset will have no impact on system accuracy and negligible impact on performance.

The CPU is restarted by resetting the values of a few key registers to their values at the last checkpoint. However, these registers cannot correct an upset in the branch prediction RAM. An altered RAM value would then remain after the retry from the checkpoint and cause the same miscompare again. This suggests that Lock Step Compare and Retry are not able to recover from a branch prediction RAM discrepancy. What is needed is a fault tolerant system employing Lock Step Compare having a prediction RAM that can be re-synchronized upon an upset in its data bits.

OBJECTS OF THE INVENTION

It is therefore an object of the invention to provide an improved fault tolerant system including the high speed performance of a prediction RAM.

It is a further object of the invention to provide a method of synchronizing a prediction RAM on two copies of the same chip type in a fault tolerant system.

It is still a further object of the invention to provide recovery from single-event upsets in a prediction RAM.

SUMMARY OF THE INVENTION

The present invention is a fault tolerant processing system including a prediction RAM employing a Lock Step Compare routine. Initialization means for setting the branch prediction RAM to a known value is activated upon the starting or restarting of a central processing unit. An error detection means detects a single event upset by comparing a lord chip's data with a vassal chip's data to detect any differences in values. When a difference in value is detected, a re-initialization means for re-synchronizing the values in the branch prediction RAM is employed to remove any branch prediction RAM discrepancy.

BRIEF DESCRIPTION OF THE DRAWINGS

These and other objects, features and advantages of the present invention will be more fully appreciated with reference to the accompanying figures.

FIG. 2 shows the RAM initialization path for lord and vassal chips.

FIG. 3a is a block diagram of the branch prediction RAM initialization microcode and FIG. 3b is a schematic showing initialization implemented in hardware.

DESCRIPTION OF THE PREFERRED EMBODIMENT

Figure 1:
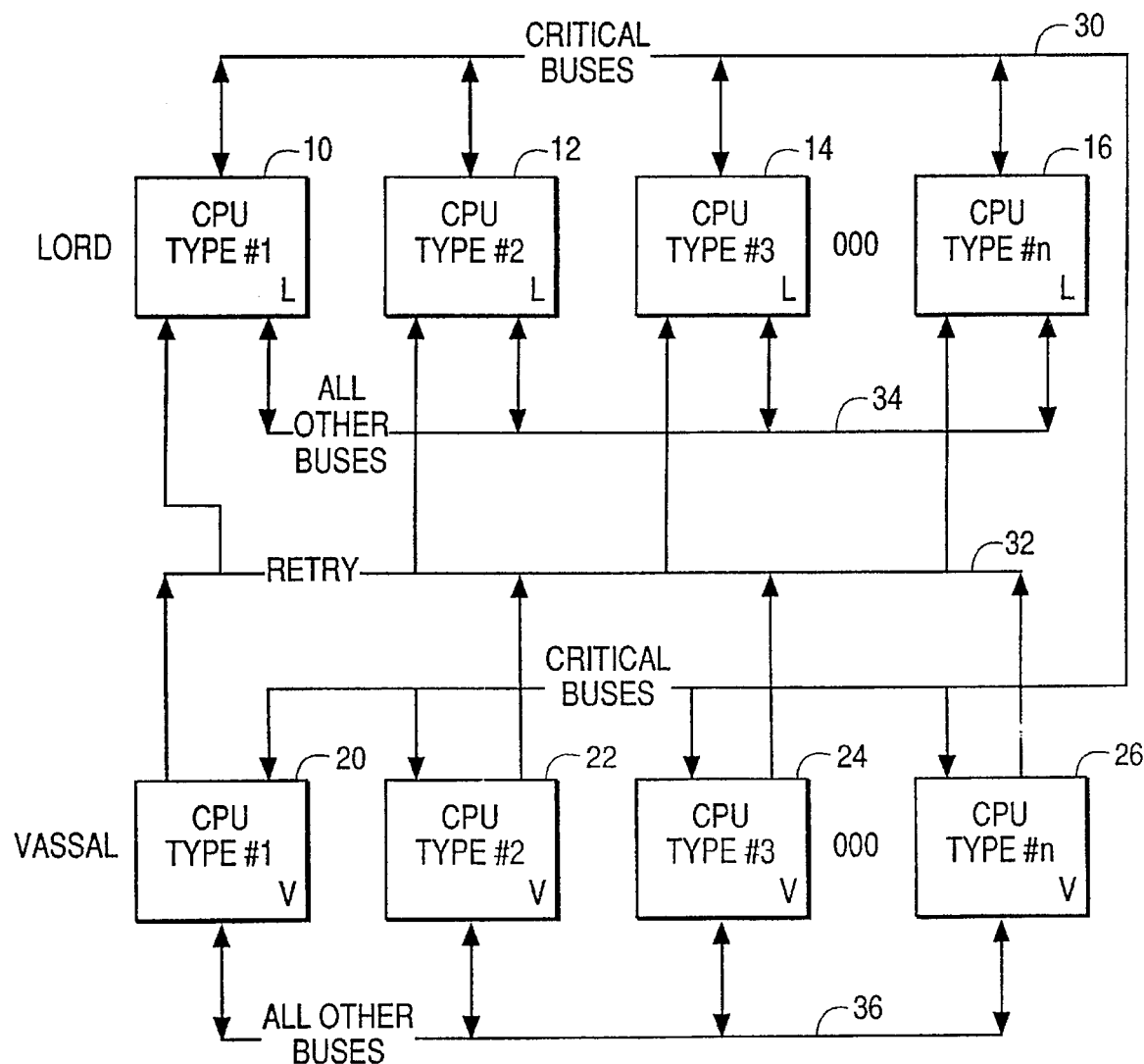
FIG. 1 illustrates a fault tolerant digital processing system employing numerous central processing units tied to communication buses.

A Lock Step Compare digital computing system is shown in FIG. 1. CPUs 10, 12, 14, and 16 make up lord or master central processing units and are electronically connected to vassal or slave central processing units 20, 22, 24, and 26. Critical buses on which a mistake if made will corrupt the state of the system are shown as 30 and 32 interconnecting the central processing units of the lord and vassal chips. Other non-critical buses 34 and 36 interconnect between the lord chips themselves or the vassal chips themselves.

To operate the central processing unit in a Lock Step Compare configuration, the design must insure that the branch prediction RAM is set at a known value during initialization. FIG. 2 is a simplified diagram of a path which allows initialization to be microcode controlled. The microcode loads the maximal value into the address, forces the data to zero, and turns the write enable on. This can be seen as the initial branch prediction which forces the write enable to one and the data bit to be zero. Addresses are loaded from the left multiplexer 48 or the right multiplexer 46 through an adder 50. This is sent to the prediction RAM 40.

The sample microcode which is used in this path is shown in FIG. 3a. Microcode 60 sets the adder to its maximum value. The addresses are loaded from adder 62 and used to write the RAM 64. Simultaneous with the RAM write 64, the address is decremented. This decremented address qualifies the conditional branch 66; if the address is greater than zero, the loading continues from load address 62. If the address is equal to zero, then the initial branch prediction signal is cleared and the routine is complete 68.

Figure 3B:
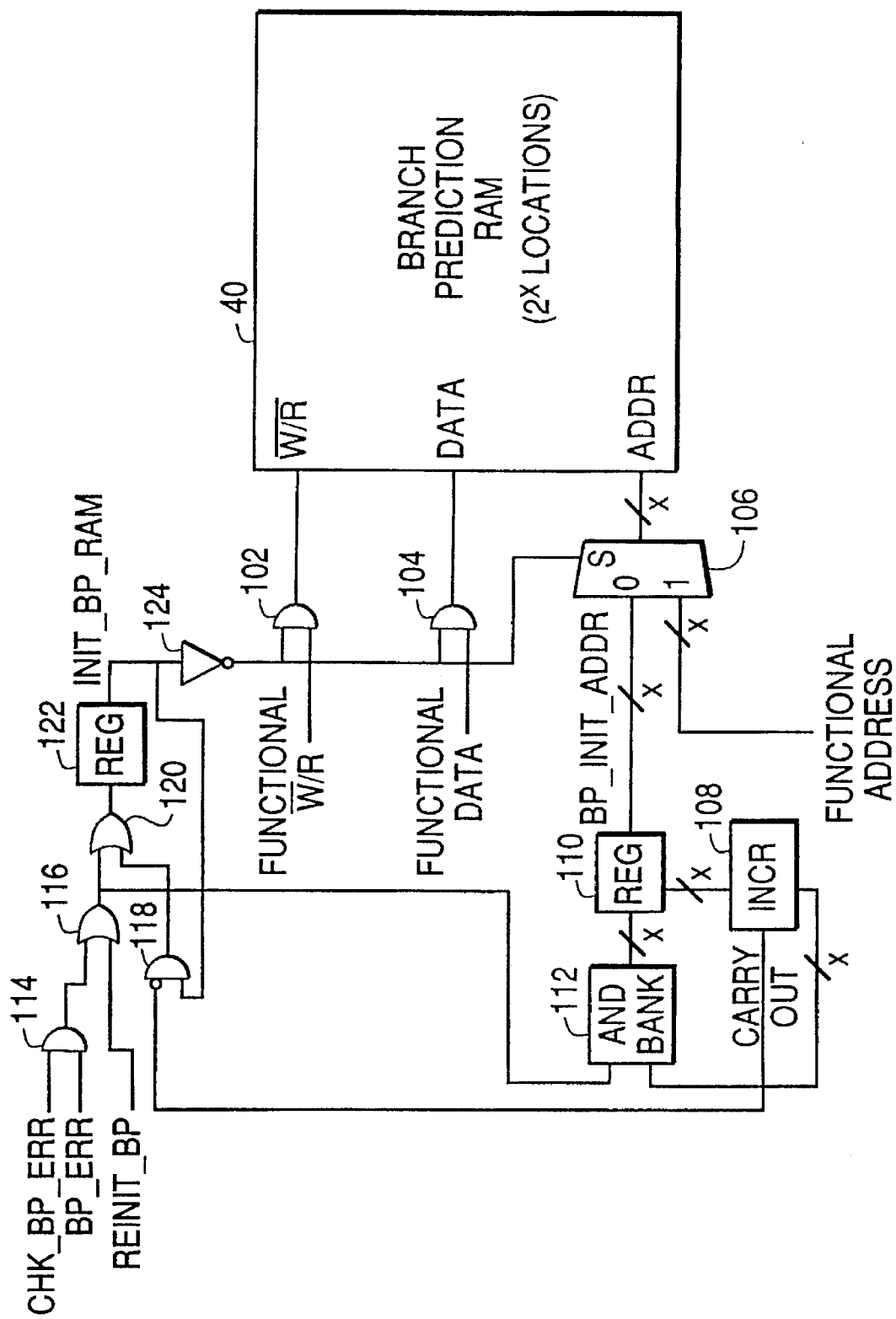

If the specific use of a branch prediction RAM re-synchronization has no microcode available, a hardware alternative is, of course, possible. FIG. 3b shows that a control register 122 can be set either by a signal from the start-up logic or from a BP_ERR 114, 116 and 120. The register then remains set until the address has cycled from all zeros to all ones and has set the Carry signals 108, 110, 112, 118 and 120. Notice that the address is set to 0 when this routine begins by the bank of AND gates 112. If the control register 122 is on, inverter 124 will set the control to write through 102 and the data to zero through AND gate 104. In addition, it will pass the BP_INIT_ADDR as the address through multiplexer 106.

By setting the RAM to all zeros during initializing, synchronization between a lord and vassal is insured unless a RAM upset is encountered. At this point, the vassal's RAM must be set to the same value as the lord's RAM or the detected miscompare will repeat itself.

To minimize the performance impact of re-initialization, hardware can be added to change a RAM entry when a miscompare is detected. The amount of hardware needed to do this may be unacceptable because of the large amount of real estate needed to produce the large amount of hardware in integrated circuit form. At the other extreme, a retry routine could include the software code needed to re-initialize the RAM. A software solution would require a large amount of memory. The cost/performance impact of either a hardware microcode or a software re-initialization can result in an engineering trade-off by including logic to detect that a branch RAM error has been encountered. The retry routine is re-initialized in the entire RAM only when a RAM error has been detected. The hardware cost of this is acceptable and the performance degradation is negligible because a likelihood of a RAM upset is very small.

Figure 4:
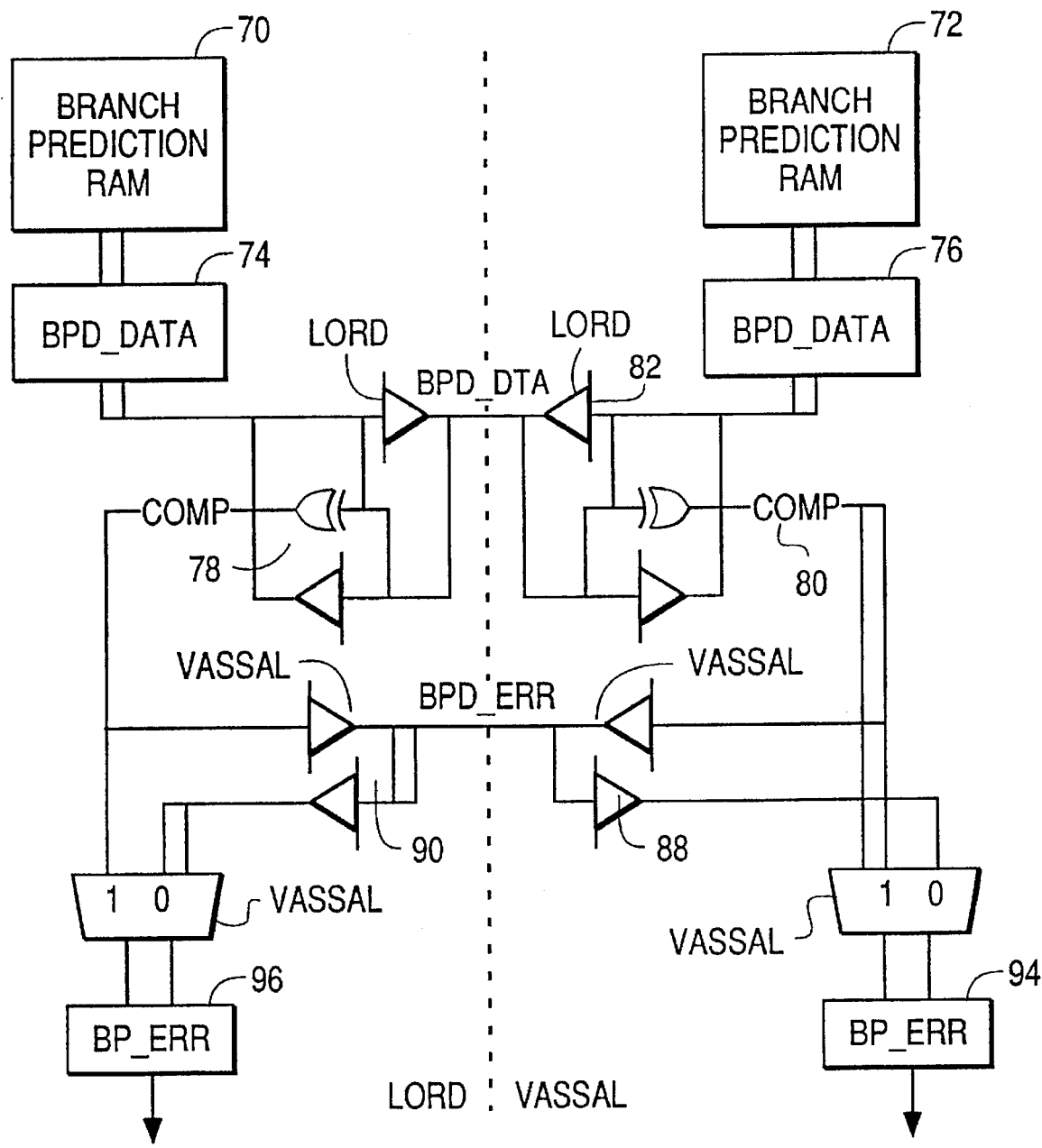
FIG. 4 is a schematic in block diagram form of the branch prediction RAM error detection for lord and vassal chips.

Shown in FIG. 4 is the branch error detection logic on both the lord chip and the vassal. Because the lord and vassal are the same chip type, the same logic elements exist on each. RAM 70 is analogous to RAM 72, transceivers 84 and 90 are analogous to 82 and 88, latches 74 and 96 are analogous to 76 and 94, and comparator output from the comparing transceiver 78 is analogous to 80. The result from branch prediction RAM 70 is stored in latch 74 and driven through transceiver 84 (note that the LORD signal will be high on the lord chip, allowing the transceiver to drive the signal). A comparison is made between the data sent by the lord and the data received in the vassal 80. Because the lord chip does not directly know what value the vassal's prediction RAM generated, it is the vassal's responsibility to inform the lord of a detected error. This is done through transceiver 88. This error signal, BPD_ERR, is received through transceiver 90 and latched in 96 in the same cycle it is latched in the vassal's latch 94. If the error is indicated in 94 and 96, the initialization routine of FIG. 3 will be re-entered to synchronize the branch Prediction RAMs 70 and 72 once more. A scheme for keeping the values of the branch prediction RAMs of the lord and the vassal identical is presented. By using microcode to control the initialization and re-synchronization, the hardware impact is minimized.

Although a specific embodiment of the present invention has been disclosed, it will understood by those of skill in the art that the foregoing and changes in form and detail may be made therein without departing from the spirit and the scope of the invention.

What is claimed is:

1. A fault tolerant data processing system employing a Lock-Step-Compare scheme including lord and vassal processing units, comprising:

initialization means for initializing contents of first and second branch prediction memories in the lord and vassal processing units, respectively, to at least one known value, the contents of the first and second branch prediction memories being:

for predicting an instruction to be executed as a result of a conditional branch instruction, wherein the predicting is before the conditional branch instruction is executed; and addressed by addresses, so that for any first address, content of the first branch prediction memory addressed by the first address is equal to content of the second branch prediction memory addressed by the first address;

error detection means for detecting a memory upset after the initializing, in response to content of the second branch prediction memory addressed by a second address being unequal to content of the first branch prediction memory addressed by the second address; and changing means for changing content of at least the second branch prediction memory in response to the detecting of the memory upset, so that content of the second branch prediction memory addressed by the second address is equal to content of the first branch prediction memory addressed by the second address.

2. The system of claim 1 wherein the initialization means comprises means for performing the initializing in response to a software microcode.

3. The system of claim 1 wherein the initialization means comprises hardware coupled to the processing system for performing the initializing.

4. The system of claim 1 wherein the changing means is integral with the initialization means and is operable to repeat the initializing in response to the detecting of the memory upset, so that content of the second branch prediction memory addressed by the second address is equal to content of the first branch prediction memory addressed by the second address.

5. A method of operating a fault tolerant data processing system employing a Lock-Step-Compare scheme including lord and vassal processing units, comprising the steps of:

initializing contents of first and second branch prediction memories in the lord and vassal processing units, respectively, to at least one known value, the contents of the first and second branch prediction memories being:

for predicting an instruction to be executed as a result of a conditional branch instruction, wherein the predicting is before the conditional branch instruction is executed; and addressed by addresses, so that for any first address, content of the first branch prediction memory addressed by the first address is equal to content of the second branch prediction memory addressed by the first address;

after the initializing, detecting a memory upset in response to content of the second branch prediction memory addressed by a second address being unequal to content of the first branch prediction memory addressed by the second address; and in response to the detecting of the memory upset, changing content of at least the second branch prediction memory, so that content of the second branch prediction memory addressed by the second address is equal to content of the first branch prediction memory addressed by the second address.

6. The method of claim 5 wherein the initializing step is performed in response to a software microcode.

7. The method of claim 5 wherein the initializing step is performed by hardware.

8. The method of claim 5 wherein the changing step comprises the step of repeating the initializing step, in response to the detecting of the memory upset, so that content of the second branch prediction memory addressed by the second address is equal to content of the first branch prediction memory addressed by the second address.

* * * * *